Patented July 7, 1936

2,047,040

UNITED STATES PATENT OFFICE 2,047,040

PLUMBITE SOLUTIONS

Alexander Stewart, Roselle, N. J., assignor to National Lead Company, New York, N. Y., a corporation of New Jersey No Drawing. Application November 4, 1932, Serial No. 641,228

8 Claims. (Cl. 23—51)

This invention relates to the concentration of lead or litharge dissolved in caustic solutions. The object is to obtain a highly concentrated stable solution of lead, litharge for example, in caustic solution, soda or potash solution for example, at ordinary working temperatures. Such solutions containing dissolved lead or litharge are known as plumbite solutions, by which title they will be herein designated.

It is already known that antimonates of lead and sodium as well as other antimonates and hypoantimonates have the faculty of increasing the possible concentration of lead oxide in plumbite solutions; that is to say, of preventing the lead oxide from crystallizing out when the solution is cooled from the temperature used for dissolving, say 90° C. down to the temperature of ordinary use, say 20° C. This is of commercial advantage in the manufacture and use of doctor solution and in the manufacture of lead peroxide and otherwise.

I have discovered that antimony trioxide $Sb_2O_3$ and other trivalent forms of antimony have this same action but in a more pronounced and powerful degree and can therefore be used in much less amount with corresponding saving of expense and cost of manufacture. For example, whereas the amount of lead antimonate or sodium antimonate that is necessary to obtain a certain concentration ranges from 1 to 5% by weight of the lead oxide, the same or superior effect is obtained by the use of antimony trioxide or other trivalent or "ous" form of antimony in the amount of only .2%. In amounts ranging from .01% to 1.% based on the charge of litharge taken, it is equivalent to amounts varying from 1 to 5% of the antimonates or hypoantimonates.

The antimonites and antimonious acids or other trivalent compounds of antimony, such as lead antimonite, PB $(SbO_2)_2$ zinc antimonite Zn $(SbO_2)_2$, potassium antimonyl tartrate (tartar emetic) $KSbOC_4H_4O_6 \cdot \frac{1}{2}H_2O$, antimony trioxide $Sb_2O_3$, etc. may be mixed with the litharge PbO before dissolving in caustic solution or may be added to the caustic before solution or before adding the lead or litharge or to the hot plumbite solution immediately after dissolving the litharge. Preferably it is mixed with litharge both being in powder or granular form, and thus combined constitutes a new composition to be sold as such for use in making plumbite or otner solutions where high concentrations are desired. Or if desired it can be mixed in the proper proportions with the lead or litharge and also the dry caustic to constitute a salable product. As little as 0.20% of antimony trioxide, the percent being based upon the amount of litharge used, was as effective as 3.50% of potassium antimonate $K_4Sb_2O_7 \cdot nH_2O$, when dissolving litharge in 30° Bé. caustic soda solution up to the point of saturation, at a temperature approximating 90° C. Antimony in the trivalent form, in amounts approximating from 0.010% to 1.00%, based upon the charge of litharge taken is sufficient to increase and maintain the solubility of litharge some 16% at ordinary temperatures when using 14° Bé. caustic soda solution, and up to approximately 262% when using 40° Bé. caustic soda solution, as will be indicated by the following results, which are approximately correct.

| Caustic soda solution concentration of | 14° Bé. | 20° Bé. | 30° Bé. | 40° Bé. |
|---|---|---|---|---|
| Soluble litharge in lbs. per gal. at 20° C. | | | | |
| Litharge substantially free from antimony compounds | 0.42 | 0.34 | 0.33 | 0.29 |
| Litharge in which trivalent antimony compounds have been added in amounts approximating 0.010 to 1.00% | 0.49 | 0.68 | 0.89 | 1.05 |

Larger amounts than 1.% are not necessary and amounts less than .01% will not generally be sufficiently effective.

The function that these compounds of antimony play, when a part or all, is dissolved in the caustic solution with lead or litharge, is to depress the temperature at which a substantial part of the soluble lead, as oxide (PbO), will crystallize out. For example, litharge pure or substantially free from antimony compounds, dissolved in 30° Bé. caustic soda solution up to the point of saturation at approximately 90° C., will upon cooling, crystallize out and precipitate at a temperature approximating 68° C., while litharge dissolved in 30° Bé. caustic soda solution under the same conditions, to which 0.20% of antimony trioxide was added, does not crystallize when cooled to 7° C. below zero. So far as I am aware all trivalent forms of antimony possess this property and the advantage stated over the antimonates or hypoantimonates previously used.

I claim:

1. A plumbite solution containing a small percentage of a trivalent form of antimony.
2. A plumbite solution containing and having its lead content retained in solution by virtue of the presence therein of, an antimonite.

3. A plumbite solution containing and having its lead content retained in solution by virtue of the presence therein of, antimonious acid.

4. A plumbite solution containing and having its lead content retained in solution by virtue of the presence therein of, tartar emetic.

5. A plumbite solution containing and having its lead content retained in solution by virtue of the presence therein of, lead antimonite.

6. The process of making plumbite solution which consists in dissolving lead oxide with a trivalent form of antimony in caustic soda solution.

7. A process of making plumbite solution which consists in dissolving litharge and a trivalent form of antimony in a caustic solution.

8. A plumbite solution of high lead concentration formed by dissolving in caustic alkali solution, metallic compounds consisting of not less than 99% of litharge and the balance an antimonite.

ALEXANDER STEWART.